(12) United States Patent
Aghara et al.

(10) Patent No.: US 10,580,267 B2
(45) Date of Patent: Mar. 3, 2020

(54) MOVABLE HAPTIC ACTUATOR

(71) Applicant: Intel Corporation, Santa Clara, CA (US)

(72) Inventors: Sanjay Aghara, Bangalore (IN); Samarth Alva, Bangalore (IN); Arvind S, Bangalore (IN); Sean J. Lawrence, Bangalore (IN); Raghavendra Angadimani, Bangalore (IN); Satyajit Siddharay Kamat, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,633

(22) Filed: Jun. 29, 2018

(65) Prior Publication Data
US 2019/0043321 A1 Feb. 7, 2019

(51) Int. Cl.
*G08B 6/00* (2006.01)
*G06F 3/01* (2006.01)

(52) U.S. Cl.
CPC ............. *G08B 6/00* (2013.01); *G06F 3/016* (2013.01)

(58) Field of Classification Search
CPC ........................................................ G08B 6/00
USPC ............................................. 340/407.1, 4.12
See application file for complete search history.

(56) References Cited

U.S. PATENT DOCUMENTS

| | | | | |
|---|---|---|---|---|
| 8,360,936 | B2* | 1/2013 | DiBenedetto | A63B 24/0062 482/8 |
| 9,439,566 | B2* | 9/2016 | Arne | A61B 5/0022 |
| 2008/0096726 | A1* | 4/2008 | Riley | A63B 24/0006 482/8 |
| 2010/0217413 | A1* | 8/2010 | Seiler | H04R 3/12 700/94 |
| 2011/0203030 | A1* | 8/2011 | Nordstrom | A41D 13/0015 2/69 |
| 2011/0298613 | A1* | 12/2011 | Ben Ayed | A61B 5/7415 340/539.11 |
| 2014/0180022 | A1* | 6/2014 | Stivoric | A61B 5/0205 600/301 |
| 2014/0228649 | A1* | 8/2014 | Rayner | A61B 5/1118 600/301 |
| 2015/0287293 | A1* | 10/2015 | Grant | G08B 6/00 340/407.1 |
| 2016/0187977 | A1* | 6/2016 | Cruz-Hernandez | G06F 1/163 345/156 |
| 2016/0338644 | A1* | 11/2016 | Connor | A61B 5/4528 |
| 2017/0178471 | A1* | 6/2017 | Levesque | A43B 11/00 |
| 2018/0036531 | A1* | 2/2018 | Schwarz | G06F 3/015 |
| 2018/0303702 | A1* | 10/2018 | Novich | A61H 3/061 |

* cited by examiner

*Primary Examiner* — Emily C Terrell
(74) *Attorney, Agent, or Firm* — Thorpe North & Western, LLP; David W. Osborne

(57) ABSTRACT

Components, devices, systems, and methods for providing a movable haptic actuator for a user interacting with a simulated environment. The simulated environment may be virtual reality, augmented reality, or mixed reality. A fastener may be used to couple the haptic actuator to a wearable article worn by the user. The haptic actuator communicates with a controller to receive information to provide feedback to the user during operations of the simulated environment. The haptic actuator may be movable from a first position on the wearable article to a second position.

28 Claims, 8 Drawing Sheets

MOVABLE HAPTIC ACTUATOR

BACKGROUND

The demand for simulated environment technology such as virtual reality (VR) devices and systems has been increasing in recent years. VR may refer to computer technologies that generate realistic images, sounds and other sensations to create an environment. The environment may be three dimensional and immersive and may simulate a user's physical presence in this environment. A user may be enabled to interact with the virtual space and objects in the environment using display screens or projectors and other devices. VR devices provide a unique user experience and may be used in any number of settings such as a user's living room or bedroom or in a public setting. Haptic simulations may be employed to physically create sensations on a user's body that simulate events that occur in the virtual reality environment.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DESCRIPTION OF EMBODIMENTS

Figure 1:
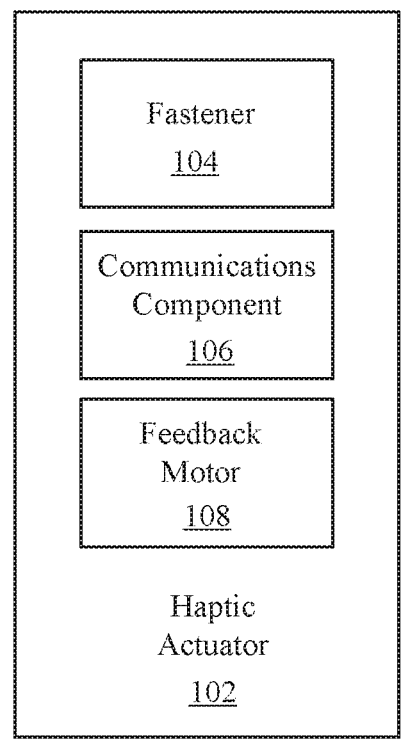
FIG. 1 is a block diagram of a haptic actuator in accordance with an example embodiment.

Before technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various technology embodiments. One skilled in the relevant art will recognize, however, that such detailed embodiments do not limit the overall technology concepts articulated herein, but are merely representative thereof.

As used in this written description, the singular forms "a," "an" and "the" include express support for plural referents unless the context clearly dictates otherwise. Thus, for example, reference to "an integrated circuit" includes a plurality of such integrated circuits.

Reference throughout this specification to "an example" means that a particular feature, structure, or characteristic described in connection with the example is included in at least one technology embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various technology embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of technolgoy embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. "Directly coupled" objects or elements are in physical contact with one another. In this written description, recitation of "coupled" provides express support for "directly coupled" and vice versa. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, comparative terms such as "increased," "decreased," "better," "worse," "higher," "lower," "enhanced," "maximized," minimized," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device, which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as VLSI, FPGAs, or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Simulated environments seek to provide a user with an immersive experience that may simulate experience from the real world or provide a fictional experience from a fantasy world. Simulated environments may be virtual reality, augmented realty, or mixed reality. Software may be used to create the simulated environment. Hardware and other technologies are employed to provide feedback or stimuli to a user's senses. For example, a haptic actuator may be employed to provide mechanical feedback to a user. A haptic actuator may be referred to as a device used for haptic or kinesthetic communication that recreates the sense of touch by applying forces, vibrations, or motions to the user. This mechanical stimulation can be used to assist in the creation of virtual objects in a computer simulation, to control such virtual objects, and to enhance the remote control of machines and devices. Haptic devices may incorporate tactile sensors that measure forces exerted by the user on the interface. Other hardware devices used for simulated environments may include a head-mounted display (HMD), such as a wearable object that a user wears on the head and over the eyes. The HMD may have a screen that displays images to the user. Headphones or other speakers may also be employed to provide audio feedback to the user.

To provide accurate haptic feedback to the user, the haptic actuator is placed in the appropriate location on the user's body. In one solution, a haptic actuator is incorporated into a wearable article such as a glove or suit that is worn by the user. The location of the haptic actuator on the wearable article may be communicated to or known by the software controlling the simulated environment. However, a haptic actuator with a fixed location on/in the wearable article limits the haptic feedback that can be provided to the user. Therefore, a haptic actuator with a fixed location may turn out to be useful for one simulated environment, but not a second simulated environment. The present technology provides a movable haptic actuator that can be placed in more than one location on a wearable article.

When moving the movable haptic actuator from one location to another, it is possible that the haptic actuator may be moved to a location on the wearable article that is not known to the simulated environment software. If the location is not known to the simulated environment software then the haptic actuator may not be useful in providing feedback to the user. The present technology provides techniques for locating the position of the movable haptic actuator on the wearable article after the movable haptic actuator has been attached or moved onto the wearable article. For example, in some embodiments, the movable haptic actuator may have a fastener that is employed to attach or couple the movable haptic actuator to the wearable article. In one embodiment, the fastener may be reusable and comprise components such as a hook and loop fastener (e.g. Velcro), snap, button, magnets, have a size that allows it to fit into a pocket, etc. or the fastener may have a one-time use such as an adhesive (e.g. an adhesive backing film) that is replaced each time the movable haptic actuator is moved.

In one aspect, the wearable article is capable of auto detecting a location of the haptic actuator on the wearable article. For example, the wearable article may comprise or comprise a conductive fabric having a matrix of addressable locations configured to indicate a presence or absence of a haptic actuator. A controller associated with the wearable article may be configured to determine a presence or absence of the haptic actuator and thus identify a location or the position of the haptic actuator on the wearable article. The location may then be communicated to the simulated environment software such that the simulated environment software may provide information to the controller for the haptic actuator to provide feedback to the user during the simulated environment experience. In some embodiments, the wearable article may be a haptic suit that is a full body suit. The wearable article may also refer to one or more of the following: gloves, vests, shirts, pants, shorts, socks, hats, hoods, arm bands, sleeves, leggings, shoes, headbands, face masks, etc.

In one embodiment, the conductive fabric of the wearable article may form rows and columns of addressable cells on the wearable article. The conductive fabric may also include leads that electrically connect to a portion of the haptic actuator. The leads combined with the addressable cells of the wearable article are employed by the controller to detect the location of the haptic actuator.

In one aspect, a sensor external to the user, the wearable article and the haptic actuator is employed to detect a location of the haptic actuator on the wearable article. For example, the sensor may be mounted to a structure such as a wall and is able to detect a wearable article and the haptic actuator within range of the sensor. The sensor may be an optical device such as digital camera or a photodiode. Once a haptic actuator is mounted or attached to the wearable article, the sensor may then operate to detect the location. In one aspect, the haptic actuator may include an emitter that emits a signal to be detected by the sensor. For example the emitter may be a light source such as an infrared light source or a laser. The sensor and emitter may employ LiDAR, or other optical technology, to determine the location of the haptic actuator. By using a sensor to determine a location of the haptic actuator, the wearable article may not employ conductive fabric. However, a wearable article with conductive fabric may also use a haptic actuator with an emitter and an external sensor to determine the location of the haptic actuator.

FIG. 1 is a block diagram illustrating a haptic actuator 102 that can be attached or coupled to a wearable article and that is movable to a different location on the wearable article in accordance with embodiments of the present technology. The haptic actuator 102 comprises a fastener 104 that is used to fasten the haptic actuator 102 to a wearable article. The fastener 104 may be reusable such that the fastener 104 can be attached and then removed and then reattached to the wearable article. The fastener 104 may be moved to a second location on the same wearable article or may be moved to a second wearable article. To reuse to the fastener 104, the fastener 104 may be comprise a material such as a hook and loop fastener or other reusable fastener. In one aspect, the fastener 104 may be designed to be used one time and may not be reusable. For example, the fastener 104 may comprise an adhesive. The one use (e.g. single use) fastener may be replaced after the one time use. The one use fastener may also be broken to remove the fastener 104 after it has been attached such as a zip tie.

The haptic actuator 102 may include a communications component 106. The communications component 106 may be used by the haptic actuator 102 to communicate with a controller such as a microcontroller. The controller may be used in conjunction with a wearable article to determine the location of the haptic actuator 102 on the wearable article. The controller may also provide information from the simulated environment software to direct the haptic actuator 102 to activate and provide feedback to a user employing the haptic actuator 102. The communications component 106 may be wired to the controller or may be wireless. The communications component 106 may use communications protocols to communicate with the controller such as Bluetooth, ZigBee, or other wireless protocols.

The communications component 106 may include a feedback motor 108. The feedback motor 108 may be referred to as a haptics motor and driver and operates to provide sensation to the user employing the haptic actuator 102. For example, the feedback motor 108 may vibrate or create other tactile sensations. The haptic actuator 102 including the communications component 106 and the feedback motor 108 may be powered via a power source. A haptic actuator may have a power source that only serves one haptic actuator. Alternatively, a single power source may power multiple haptic actuators associated with the same wearable article.

Figure 2:
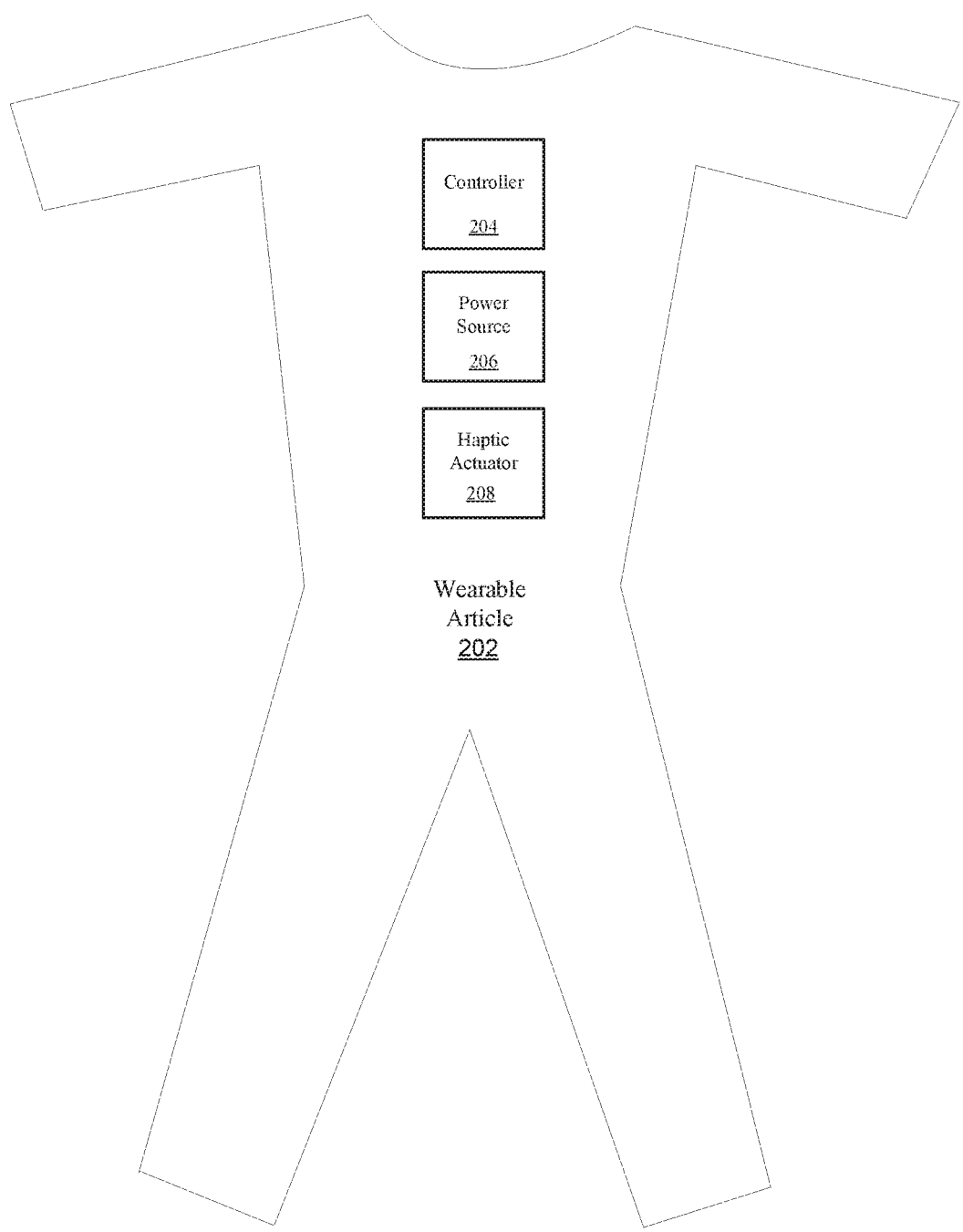
FIG. 2 is a block diagram of a wearable article with a haptic actuator in accordance with an example embodiment.

FIG. 2 is a block diagram illustrating a wearable article 202 configured to have a haptic actuator 208 attached or otherwise coupled to the surface of the wearable article 202. The wearable article 202 is depicted as a full body haptic suit. However, it is understood, that the wearable article can be any wearable article as recited herein or others not expressly mentioned. A full body haptic suit may cover some or all of a user's body including hoods, gloves, feet coverings etc. A full body haptic suit may be one piece or may have multiple components that are connected to one another while worn by a user. For example, gloves may be separate and placed on the user's body after the suit is placed on the user's body. The gloves or other components may be attached to the suit via electrical connections. The wearable article 202 may also refer to any type of wearable article including but not limited to gloves, vests, shirts, pants, shorts, socks, hats, hoods, arm bands, sleeves, leggings, shoes, etc.

In one aspect, the wearable article 202 is capable of housing or having the haptic actuator 208 attached to any location on the wearable article 202. The haptic actuator 208 may have all or some of the capabilities and features described for the haptic actuator 102 of FIG. 1. After the haptic actuator 208 has been attached to a first location on the wearable article 202, the haptic actuator 208 may be moved to a second location on the wearable article 202. The haptic actuator 208 may be moved to any number of locations on the wearable article 202. In one aspect, the wearable article 202 may have a predetermined number of connection points for the haptic actuator 208 to be attached to the wearable article 202. The wearable article 202 is capable of having one haptic actuator attached or a plurality of haptic actuators attached to the surfaces of the wearable article 202. In one aspect, the simulated environment software may direct the user to attach the haptic actuator 208 to a particular location on the wearable article 202. The direction may be due to simulations in the simulated environment software that simulate sensations on a particular location on the user's body. The wearable article 202 may comprise a flexible fabric that is sufficiently flexible to substantially conform to contours of a user's body. For example, the flexible fabric may be designed to fit closely over a user's arm but also allows for freedom of movement for the user's arm to bend, flex, and rotate. By conforming to the contours of the user's body, the wearable article 202 is able to house the haptic actuator 208 on nearly any location of a user's body and provide feedback to the user at the location.

The wearable article 202 may include a controller 204. The controller 204 may communicate with the haptic actuator 208. The controller 204 may receive information from the simulated environment software. The information may be sent to the haptic actuator 208 as commands for the haptic actuator 208 to provide feedback to the user wearing the wearable article 202. The controller 204 may be capable of communicating with a plurality of haptic actuators. The controller may communicate wireless or use wired connected to communicate with the haptic actuator 208. For wireless communications, the controller 204 may employ a transmitter and receiver that use wireless protocols such as Bluetooth or ZigBee. For wired communications, a plurality of haptic actuators may be daisy chained together to communicate with the controller 204. The wearable article 202 may include a power source 206. The power source 206 may be a battery or other mobile power source. The battery may be rechargeable or a one-time use power source. The power source 206 may power a plurality of haptic actuators or one haptic actuator. The power source may be wired to an external power source such as a traditional electrical wall outlet.

In one aspect, the simulated environment software may direct a user where to place the haptic actuator 208 on the wearable article 202. For example, the simulated environment software may direct the user to fasten the haptic actuator 208 to the right side of the abdomen of the wearable article 202. The simulated environment software may generate objects (e.g. physics objects) in the simulated environment designed to interface with a particular location of the user's body. The directed location will allow the haptic actuator 208 to provide feedback from the simulated environment software to the user based on the location of the physics objects in the simulated environment. After the haptic actuator 208 has been fastened to the right side of the abdomen, the techniques of the present technology may be employed to detect the actual location of the haptic actuator 208. If the haptic actuator 208 is located at the proper location directed by the simulated environment software, the simulated environment may begin operations. The simulated environment software may also determine that the haptic actuator 208 is not in the proper directed location. The simulated environment software may then provide further directions to the user to modify or move the location of the haptic actuator 208 on the wearable article 202.

Figure 3A:
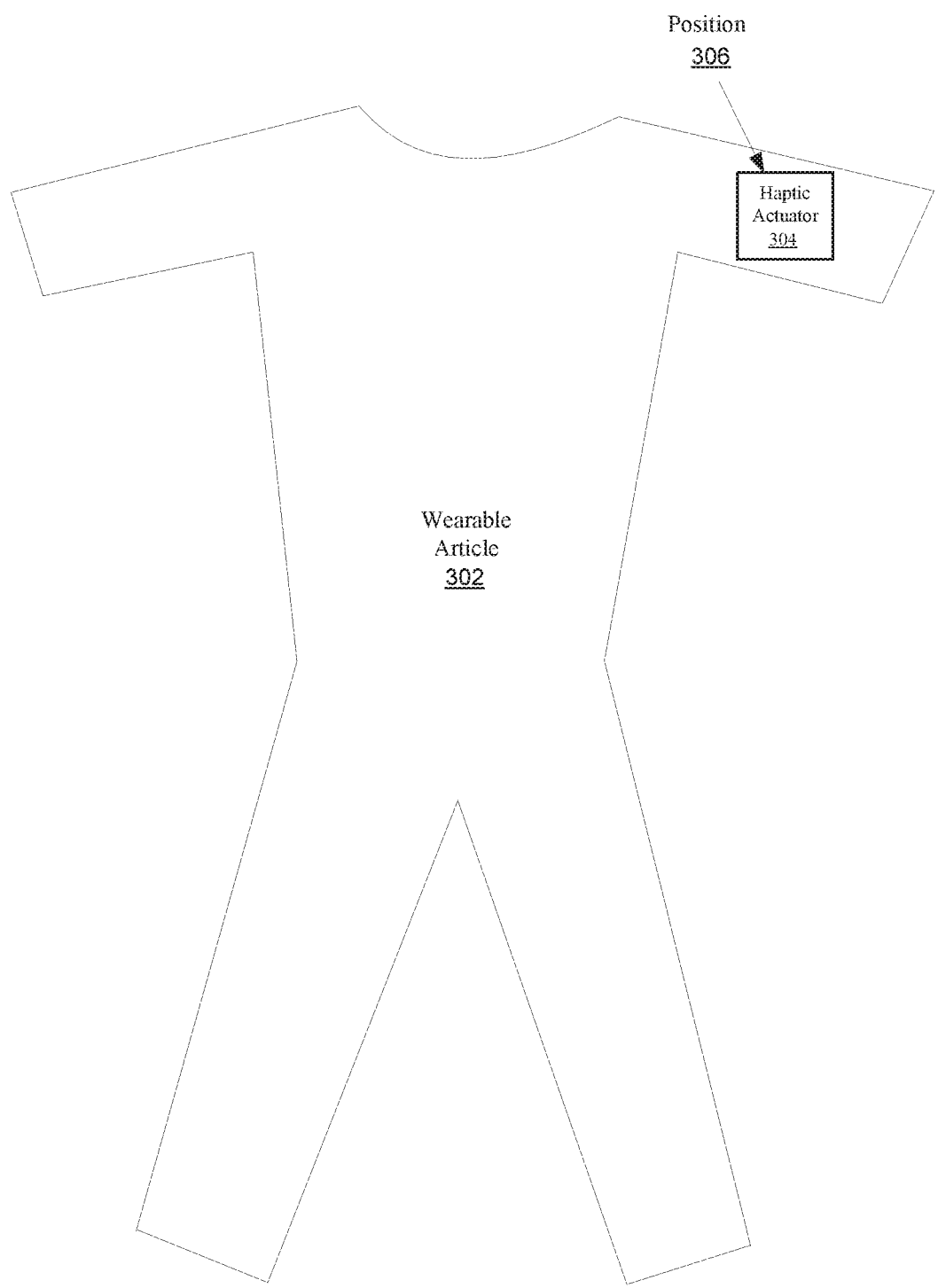
FIGS. 3A-3B are block diagrams of a haptic actuator moving from a first location to a second location on a wearable article in accordance with an example embodiment.
Figure 3B:
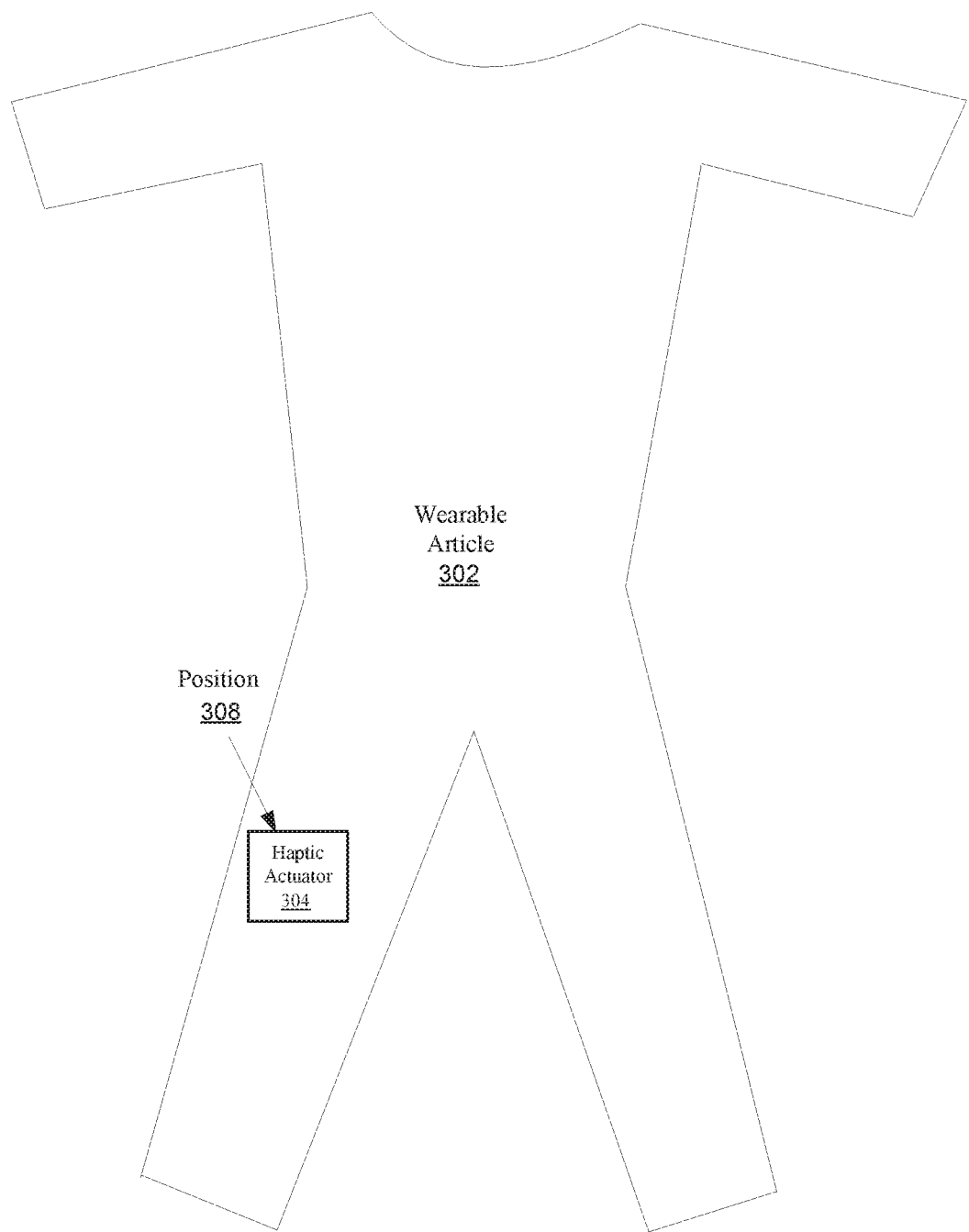

FIGS. 3A and 3B are block diagrams illustrating a wearable article 302 configured to have a haptic actuator 304 attached or otherwise coupled to the surface of the wearable article 304. The wearable article 304 and the haptic actuator 304 may have all the same features and capabilities of the wearable article 202 of FIG. 2 and the haptic actuator 102 of FIG. 1 and the haptic actuator 208 of FIG. 2 respectively.

FIG. 3A depicts the haptic actuator located at position 306 on the wearable article 302. The position 306 may be described as the left arm of the wearable article 302. The haptic actuator 304 may be fastened or attached to the position 306. Once the haptic actuator 304 is fastened in the position 306, the haptic actuator 304 may be communication with a controller to receive information from the simulated environment software. After the haptic actuator 304 has been fastened in the position 306, the haptic actuator 304 may be moved to another location on the wearable article 302 or moved to a different wearable article. FIG. 3B depicts the haptic actuator 304 after the haptic actuator 304 has been moved to a position 308. The position 308 may be described as the right leg of the wearable article 302. Thus the haptic actuator 304 may be used at a first location and may then be moved to a second location on the wearable article 302. The ability to move the haptic actuator 304 to more than one location allows the same wearable article and the same haptic actuator to be used in more than one configuration. This may be useful for using the wearable article 302 and the haptic actuator 304 with different simulated environments or for different parts of the same simulated environment. The wearable article may comprise the conductive fabric 402 or the wearable article may comprise some other material and the conductive fabric 402 may be stitched onto the other material.

Figure 4:
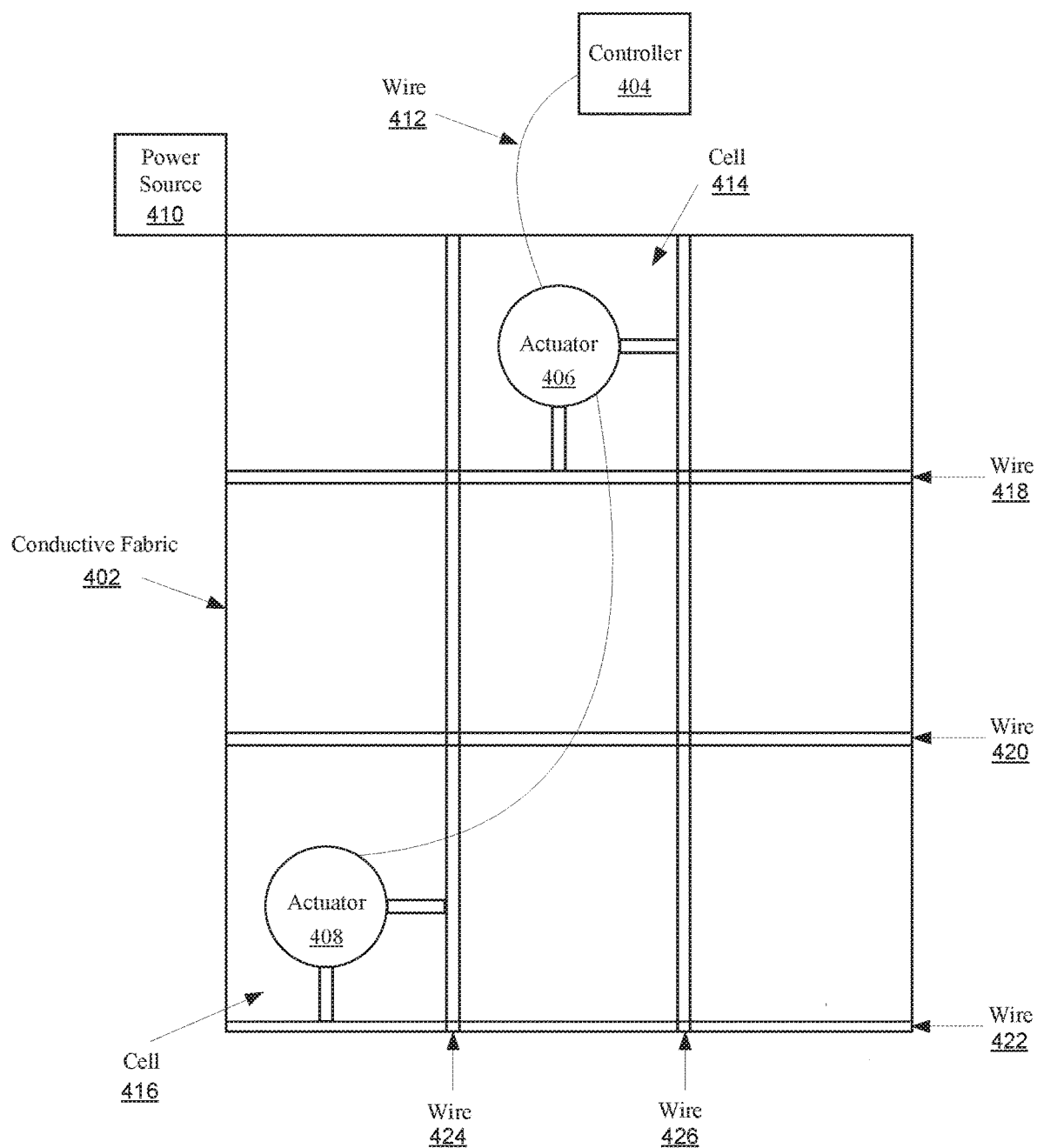
FIG. 4 is a block diagram of a conductive fabric in accordance with an example embodiment.

FIG. 4 is a block diagram illustrating a conductive fabric 402 for a wearable article configured to have a haptic actuator attached or otherwise coupled to the surface of the wearable article in accordance with embodiments of the present technology. The conductive fabric 402 may be used for a wearable article such as the wearable article 202 of FIG. 2. The conductive fabric 402 may be described as having a matrix of addressable locations or cells configured to indicate a presence or absence of a haptic actuator. For example, the conductive fabric 402 may comprise a plurality of layers where at least one layer comprise material such as fabric or rubber that conforms to the user's body. Another layer may composed of conductive wires as depicted by wires 418, 420, 422, 424, and 426. The wires 418, 420, 422, 424, and 426 may form a pattern such as a grid pattern over the surface of the wearable article. This may be described as a matrix formed by rows and columns of wires. The pattern of the wires 418, 420, 422, 424, and 426 may form cells such as cell 414 and cell 416. The cells may be addressable and allow the controller 404 to determine the presence or absence of an actuator. FIG. 4 depicts actuator 406 in cell 414 and actuator 408 in cell 416.

The actuator 406 and the actuator 408 may have all the same features and capabilities of the haptic actuator 102 of FIG. 1. A haptic actuator may fasten to the conductive fabric 402 within one cell of the conductive fabric 402 or may fasten to and cover a plurality of cells. The actuator 406 is depicted as being connected to the controller 404 via the wire 412. In this wired solution, the actuator 406 is also connected to the actuator 408. Thus a plurality of haptic actuators may be couple in series (e.g. daisy chained) to one another using wires that lead back to the controller 404. The wire 412 and the wire connecting the actuator 406 to the actuator 408 may be used to send control information from the controller 404 while the controller 404 interfaces with the simulated environment software. The wire 412 may be connected to the controller 404 using a 12C bus. The wire 412 may also be used to supply power to the actuator 406 and the actuator 408. In a wireless solution, the actuator 406 may communicate with the controller 404 without wires.

The wires 418, 420, 422, 424, and 426 may carry an electric current from a power source 410. The power source 410 may be attached or coupled to the conductive fabric 402 or may be separate from the conductive fabric 402. The power source 410 may be a battery or other power source. The power source 410 may be used to power the actuator 406 and the actuator 408. However, a separate power source may be used to power the haptic actuators fastened to the conductive fabric 402. The power source 410 may supply current and voltage to the wires 418, 420, 422, 424, and 426. In one aspect, the current may be a few micro amperes. The actuator 406 is depicted as being in contact with the wire 418 and the wire 426. The actuator 408 is depicted as be in contact with the wire 422 and the wire 424. An actuator that is in contact with one of the wires 418, 420, 422, 424, and 426 will change the voltage, current, and/or resistance in the particular wire. Sensors associated with the power source 410 or the controller 404 may then detect the presence or absence of a haptic actuator. In one aspect, the actuator 406 or the actuator 408 detect their location on the conductive fabric 402 and communicate that information to the controller 404. The controller 404 may map each address of the cells of the conductive fabric 402 and thus once an address of a haptic actuator is known, the location of the haptic actuator on the wearable article may be known. This information may be communicated to the simulated environment software. The simulated environment software may then use this information to provide commands to the haptic actuator to provide feedback to the user employing the wearable article and the haptic actuators where the feedback is based on what is occurring in the simulated environment. For example, the simulated environment may create physics objects in the simulated environment that correspond with the location of the haptic actuator fastened to the wearable article.

Figure 5:
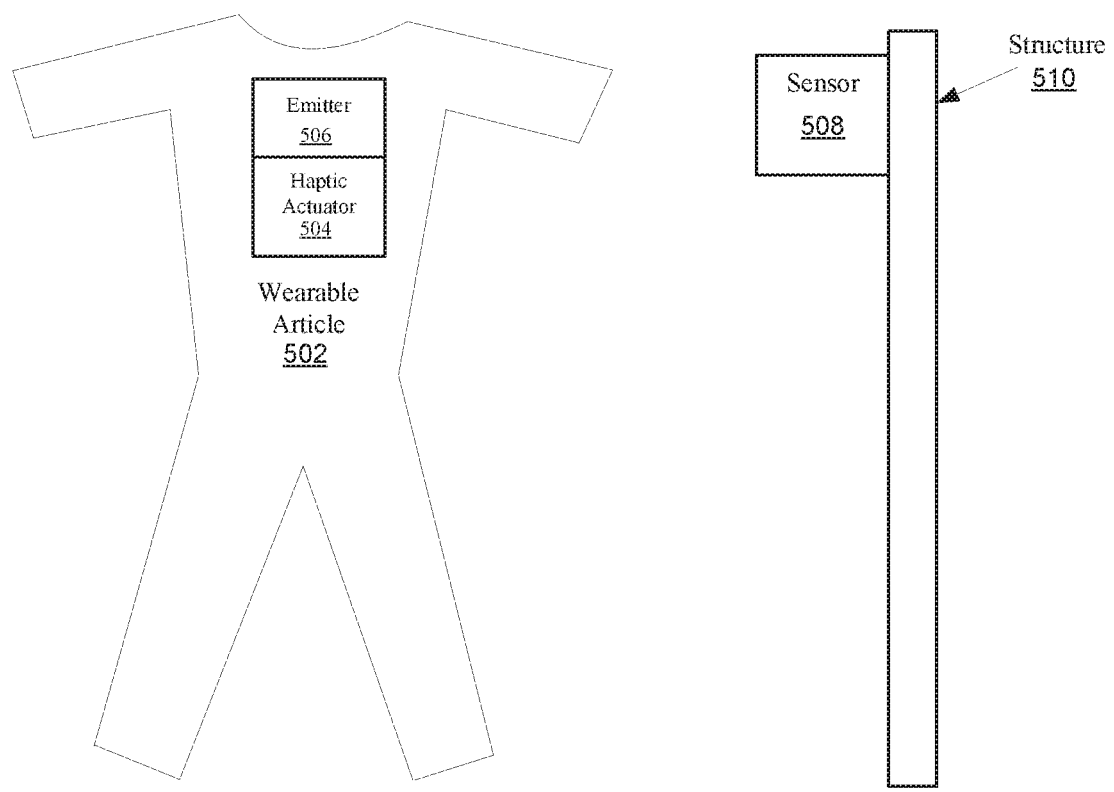
FIG. 5 is a block diagram of a sensor used to detect a location of a haptic actuator on a wearable article in accordance with an example embodiment.

FIG. 5 is a block diagram illustrating a wearable article 502 configured to have a haptic actuator 504 attached or otherwise coupled to the surface of the wearable article in accordance with embodiments of the present technology. The haptic actuator 504 may have all the same feature and capabilities of the haptic actuator 102 of FIG. 1. The wearable article 502 may have all the same feature and capabilities of the wearable article 202 of FIG. 2. The wearable article 502 may or may not have conductive fabric. The haptic actuator 504 may be fastened to a first location of the wearable article 502 and then later fastened to a second location on the wearable article 502 or to a different wearable article. To determine the location of the haptic actuator 504 on the wearable article 502, a sensor 508 may sense the wearable article 502 and the haptic actuator 504. The sensor 508 may be capable of identifying the location of the haptic actuator 504. In one embodiment, the sensor 508 may be a camera such as a digital camera that uses optical technology to recognize or sense the wearable article 502 and the haptic actuator 504. The sensor 508 may also be a photodiode or other type of sensor.

The haptic actuator 504 may be coupled to, or otherwise associated with, an emitter 506. The emitter 506 may emit or generate a signal for the sensor 508 to recognize. For example, the emitter 506 may be a light source including an infrared light source or a laser. The sensor 508 and the emitter 506 together may employ techniques such as LiDAR to identify a position of the haptic actuator 504. The position of the haptic actuator 504 may be determined in virtual space in the simulated environment software and mapped to positions on the user's body. In one aspect, the sensor 508 may identify the location of the haptic actuator 504 by any outside-in mechanism with respect to a fixed reference. In one aspect, the emitter 506 is emitting light that a camera of sensor 508 can detect and the location of the haptic actuator 504 on the wearable article 502 is detected or tracked by the camera connected to host system and an accurate depth and position of the haptic actuator 504 is created using a body model of the user with the wearable article 502.

The sensor 508 may be mounted on a structure 510. For example, the structure 510 may be a wall or a pole. The sensor 508 may have a range for operations. Therefore the user of the wearable article 502 may stand within range of the sensor 508 while the sensor 508 is detecting the location of the haptic actuator 504. The sensor 508 may be capable of detecting a plurality of haptic actuators fastened to the wearable article 502.

During the use of the wearable article 502 with the haptic actuator 504 for a simulated environment, the haptic actuator 504 may be moved on the wearable article 502 or another haptic actuator may be fastened to the wearable article 502. The sensor 508 may be capable of detecting the move of the haptic actuator 504 to a second location on the wearable article 502 and may be capable of detecting the additional haptic actuator fastened to the wearable article 502. The sensor 508 may be configured to operate at predetermined intervals. For example, the sensor 508 may perform operations to detect the location of potential haptic actuator every five seconds or at any other interval. Alternatively, the sensor 508 may continually operate during a simulated environment session such that the location of the haptic actuator 504 may be continually updated in real time. This may be described as automatically tracking a location of the haptic actuator 504. The sensor 508 may be used in conjunction with a computer system to identify and determine the location of the haptic actuator 504 on the wearable article 502. The computer system may incorporate the sensor 508 or may be located remotely from the sensor 508.

Once the position or location of the haptic actuator 504 has been identified on the wearable article 502, information pertaining to the position of the haptic actuator 504 may be sent to a controller associated with the wearable article 502 and the simulated environment software. The simulated environment software may be executing on a computer system separate from the wearable article 502 and the sensor 508. The simulated environment software may map the location of the haptic actuator 504 on the user's body and then provide information to the haptic actuator 504 via the control such that the haptic actuator 504 provides feedback in the form of physical sensations during the simulated environment operations.

Figure 6:
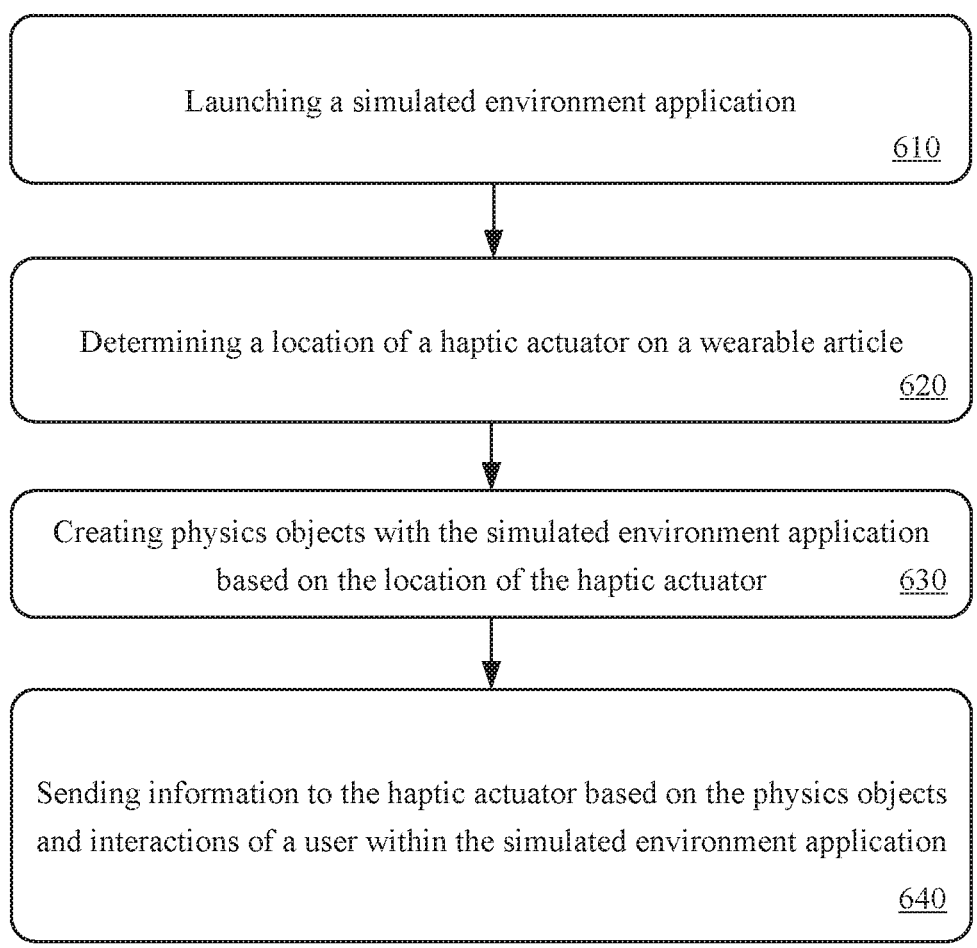
FIG. 6 is a flow diagram of a method for calibrating a location of a haptic actuator on a wearable article in accordance with an example embodiment.

FIG. 6 illustrates a flow diagram of process 600 for methods or operations for providing haptic feedback in accordance with embodiments of the present technology. For example, starting in block 610 a simulated environment application is launched. The simulated environment application may be used to generate virtual reality, augmented reality, or mixed reality. The simulated environment application may be executed using a processor and memory. A location of a haptic actuator on a wearable article may be determined, as in block 620. Physics objects with the simulated environment application based on the location of the haptic actuator may be created, as in block 630. Information may be sent to the haptic actuator based on the physics objects and interactions of a user within the simulated environment application, as in block 640.

Figure 7:
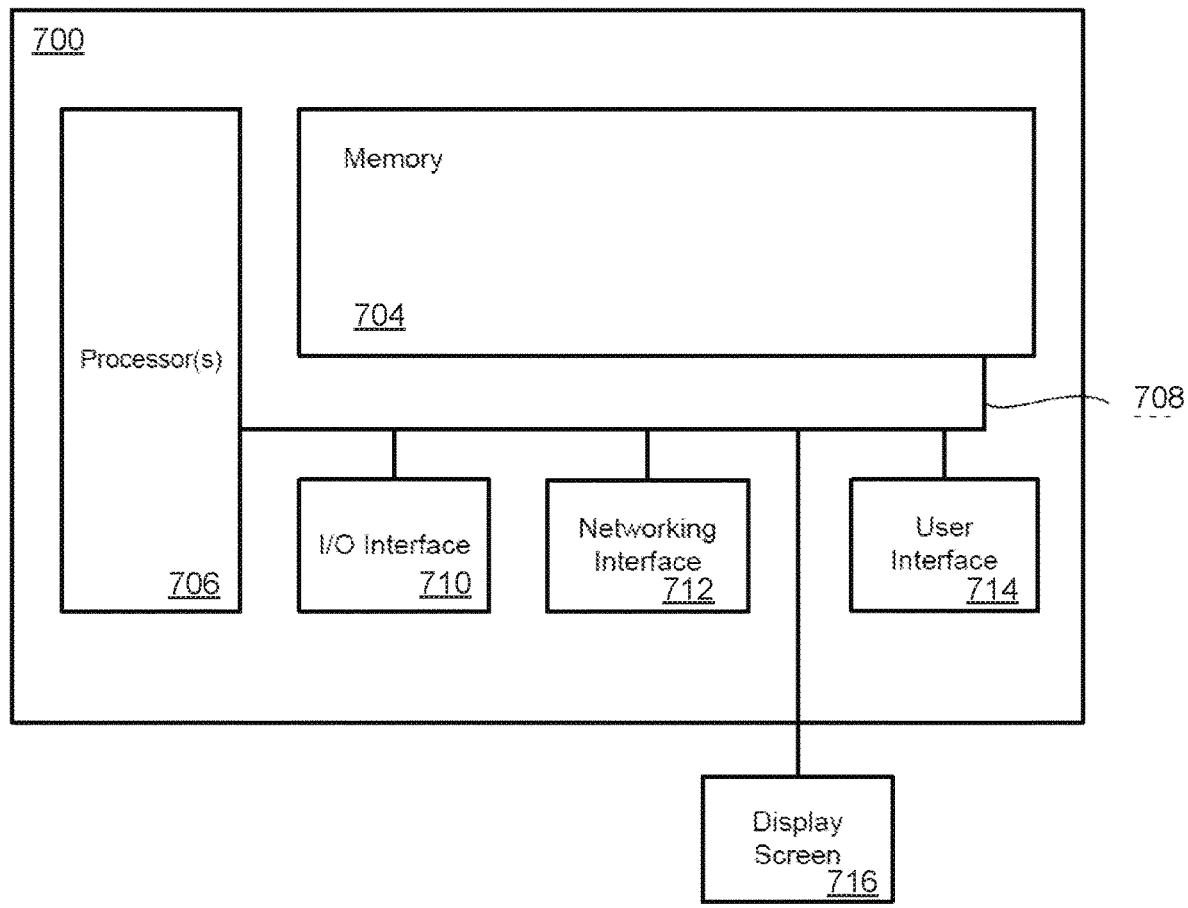
FIG. 7 is a block diagram of an example computer system with an electronic device package in accordance with another example embodiment.

FIG. 7 depicts an exemplary system upon which embodiments of the present disclosure may be implemented. For example, the system of FIG. 7 may be a computer system that executes software for a simulated environment. Components of the system of FIG. 7 may be used for a virtual reality, augmented reality, or mixed simulation. The system can include a memory controller, memory 704, a processor 706, and circuitry 708. Various embodiments of such systems for FIG. 7 can include smart phones, laptop computers, handheld and tablet devices, CPU systems, SoC systems, server systems, networking systems, storage systems, high capacity memory systems, or any other computational system.

The system can also include an I/O (input/output) interface 710 for controlling the I/O functions of the system, as well as for I/O connectivity to devices outside of the system. A network interface can also be included for network connectivity, either as a separate interface or as part of the I/O interface 710. The network interface can control network communications both within the system and outside of the system. The network interface can include a wired interface, a wireless interface, a Bluetooth interface, optical interface, and the like, including appropriate combinations thereof.

Furthermore, the system can additionally include various user interfaces, display devices, as well as various other components that would be beneficial for such a system.

The system can also include memory in addition to memory 704 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 706 can be a single or multiple processors, and the memory 704 can be a single or multiple memories. The local communication interface can be used as a pathway to facilitate communication between any of a single processor, multiple processors, a single memory, multiple memories, the various interfaces, and the like, in any useful combination.

The system can also include a networking interface 712, and a user interface 714 for interacting with the user. The system can also include a display screen 716 for displaying images and the user interface 714 (e.g. a graphical user interface).

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

EXAMPLES

The following examples pertain to specific technology embodiments and point out specific features, elements, or steps that may be used or otherwise combined in achieving such embodiments.

In one example there is provided a haptic actuator, comprising: a fastener configured to attach the haptic actuator to a location on a wearable article; a communication component configured to communicate with a controller associated with the wearable article; and a feedback motor and driver configured to provide haptic feedback to a user in response to input from simulated environment software received via the communication component.

In one example of the haptic actuator, the haptic actuator is movable to a second location after the haptic actuator has been used at a first location on the wearable article.

In one example of the haptic actuator, the wearable article comprises a resistor array configured to be powered by a power source associated with the wearable article.

In one example of the haptic actuator, the haptic actuator further comprising a power source operable to power the haptic actuator.

In one example of the haptic actuator, the communication component comprises a wireless transmitter operable to communicate with the wearable article.

In one example of the haptic actuator, the wireless transmitter employs Bluetooth or ZigBee wireless protocols.

In one example of the haptic actuator, the communication component comprises a wired transmitter operable to communicate with the wearable article.

In one example of the haptic actuator, the haptic actuator is wired to a plurality of haptic actuators coupled together operable to each be located on the wearable article and to share a common power source.

In one example of the haptic actuator, the haptic suit controller is configured to calibrate the location of the haptic actuator on the wearable article before the simulated environment software provides information to the communication component.

In one example of the haptic actuator, the fastener is a hook and loop fastener.

In one example of the haptic actuator, the fastener is a reusable fastener.

In one example of the haptic actuator, the haptic actuator further comprises an emitter configured to generate a signal.

In one example of the haptic actuator, the signal generated by the emitter is light.

In one example of the haptic actuator, the signal generated by the emitter is infrared light.

In one example of the haptic actuator, the emitter is a laser.

In one example there is provided a wearable article, comprising: a conductive fabric having a matrix of addressable locations configured to indicate a presence or absence of a haptic actuator; and a controller configured to determine a presence or absence of the haptic actuator and identify a location thereof on the wearable article.

In one example of the wearable article, the matrix of the conductive fabric has rows and columns with addressable cells.

In one example of the wearable article, the fabric is sufficiently flexible to substantially conform to contours of a user's body.

The wearable article of claim 16, further comprising a power source capable of powering the conductive fabric, the controller, the haptic actuator, or a combination thereof.

In one example of the wearable article, the wearable article comprises a resistor array configured to be powered by a power source associated with the wearable article.

In one example of the wearable article, the controller comprises a wireless transmitter operable to communicate with the haptic actuator.

In one example of the wearable article, the wireless transmitter employs Bluetooth or ZigBee wireless protocols.

In one example of the wearable article, the controller comprises a wired transmitter operable to communicate with the haptic actuator.

In one example of the wearable article, the controller is configured to calibrate the location of the haptic actuator on the wearable article before a simulated environment software provides information to the haptic actuator.

In one example of the wearable article, the wearable article is a haptic suit.

In one example of the wearable article, the controller is a microcontroller.

In one example of the wearable article, the wearable article further comprising a reusable fastener configured to attach the haptic actuator to the wearable article.

In one example there is provided a haptic feedback system, comprising: a haptic actuator, comprising: a fastener; a communication component configured to receive commands; and a feedback motor and driver configured to provide haptic feedback to the user in response to input from simulated environment software received via the communication module; a wearable article, comprising: a conductive fabric having a matrix of addressable locations configured to indicate a presence or absence of the haptic actuator; and a controller configured to communicate with the communication component of the haptic actuator to provide feedback to the haptic actuator from simulated environment software.

In one example of the haptic feedback system, the fastener is reusable and the haptic actuator is movable to a second location on the wearable article after being detached from a first location on the wearable article.

In one example of the haptic feedback system, the haptic feedback system further comprising a power source associated with the wearable article and capable of powering the conductive fabric, the controller, or the haptic actuator, or a combination thereof.

In one example of the haptic feedback system, the haptic feedback system further comprising a power source associated with the haptic actuator.

In one example of the haptic feedback system, the wearable article comprises a resistor array configured to be powered by a power source associated with the wearable article.

In one example of the haptic feedback system, the controller and the communication component are operable to communicate using wireless components.

In one example of the haptic feedback system, the wireless transmitter employs Bluetooth or ZigBee wireless protocols.

In one example of the haptic feedback system, the controller and the communication component are configured to communicate using wired components.

In one example of the haptic feedback system, the controller is configured to calibrate the location of the haptic actuator on the wearable article before the simulated environment software provides information to the haptic actuator.

In one example of the haptic feedback system, the fabric is sufficiently flexible to substantially conform to contours of a user's body.

In one example there is provided a haptic feedback system, comprising: a haptic actuator, comprising: a fastener; a communication component configured to receive commands; a feedback motor and driver configured to provide haptic feedback to a user in response to input from simulated environment software received via the communication module; an emitter configured to generate a signal; a wearable article configured to receive the haptic actuator at a location on the wearable article via the fastener, further comprising: a controller for configured to communicate with the communication component of the haptic actuator to provide information to the haptic actuator from simulated environment software; a sensor configured to detect the signal generated by the emitter and determine a location of the haptic actuator on the wearable article.

In one example of the haptic feedback system, the fastener is reusable and the haptic actuator is movable to a second location on the wearable article after being detached from a first location on the wearable article.

In one example of the haptic feedback system, the signal generated by the emitter is light.

In one example of the haptic feedback system, the signal generated by the emitter is infrared light.

In one example of the haptic feedback system, the sensor is a photodiode.

In one example of the haptic feedback system, the sensor comprises a camera.

In one example of the haptic feedback system, the emitter is a laser that employs LiDAR.

In one example of the haptic feedback system, the controller is configured to calibrate the location of the haptic actuator on the wearable article before the simulated environment software provides information to the haptic actuator.

In one example, there is provided a method for calibrating a location of a haptic actuator on a wearable article, comprising: launching a simulated environment application; determining a location of a haptic actuator on a wearable article; creating physics objects with the virtual reality application based on the location of the haptic actuator; and sending information to the haptic actuator based on the physics objects and interactions of a user within the virtual reality application.

In one example of the method, the method further comprising: periodically updating the location of the haptic actuator on the wearable article.

In one example of the method, the location is determined via a controller associated with the wearable article that determines the location based on a conductive fabric that interfaces with the haptic actuator.

In one example of the method, the location is determined via a controller associated with the wearable article that determines the location based on a conductive fabric that interfaces with the haptic actuator.

In one example of the method, the conductive fabric is formed in a row and column matrix such that each location formed by the row and column matrix is addressable and the conductive fabric is configured to receive leads associated with the haptic actuator.

In one example of the method, the location is determined via a sensor external to the wearable article and the haptic actuator by sensing a signal generated by an emitter associated with the haptic actuator.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A haptic actuator, comprising:
   a fastener configured to attach the haptic actuator to a location on a wearable article and to allow detachment of the haptic actuator from the wearable article;
   a communication component configured to communicate with a controller associated with the wearable article; and
   a feedback motor and driver configured to provide haptic feedback to a user in response to input from simulated environment software received via the communication component,
   wherein the location of the haptic actuator on the wearable article is identifiable to the simulated environment software upon attachment of the haptic actuator to the wearable article.

2. The haptic actuator of claim 1, wherein the wearable article comprises a resistor array configured to be powered by a power source associated with the wearable article.

3. The haptic actuator of claim 1, the haptic actuator further comprising a power source operable to power the haptic actuator.

4. The haptic actuator of claim 1, wherein the communication component comprises a wireless transmitter operable to communicate with the wearable article.

5. The haptic actuator of claim 1, wherein the communication component comprises a wired transmitter operable to communicate with the wearable article.

6. The haptic actuator of claim 1, wherein the haptic actuator is wired to a plurality of haptic actuators coupled together operable to each be located on the wearable article and to share a common power source.

7. The haptic actuator of claim 1, wherein the controller associated with the wearable article is configured to calibrate the location of the haptic actuator on the wearable article before the simulated environment software provides information to the communication component.

8. The haptic actuator of claim 1, wherein the fastener is a reusable fastener.

9. The haptic actuator of claim 1, further comprising an emitter configured to generate a signal.

10. A wearable article, comprising:
a conductive fabric having a matrix of addressable locations configured to indicate a presence or absence of a reattachable haptic actuator, comprising a motor and a driver, upon attachment of the haptic actuator to the conductive fabric, and
a controller configured to determine a presence or absence of the haptic actuator and identify an addressable location thereof on the wearable article to provide feedback to the haptic actuator from simulated environment software through a communication component.

11. The wearable article of claim 10, wherein the matrix of the conductive fabric has rows and columns with addressable cells.

12. The wearable article of claim 10, wherein the fabric is sufficiently flexible to substantially conform to contours of a user's body.

13. The wearable article of claim 10, further comprising a power source capable of powering the conductive fabric, the controller, the haptic actuator, or a combination thereof.

14. The wearable article of claim 10, wherein the wearable article comprises a resistor array configured to be powered by a power source associated with the wearable article.

15. The wearable article of claim 10, wherein the controller comprises a wireless transmitter operable to communicate with the haptic actuator.

16. The wearable article of claim 10, wherein the controller comprises a wired transmitter operable to communicate with the haptic actuator.

17. The wearable article of claim 10, wherein the controller is configured to calibrate the location of the haptic actuator on the wearable article before a simulated environment software provides information to the haptic actuator.

18. The wearable article of claim 10, wherein the wearable article is a haptic suit.

19. The wearable article of claim 10, further comprising a reusable fastener configured to attach the haptic actuator to the wearable article.

20. A haptic feedback system, comprising:
a haptic actuator, comprising:
a fastener configured to attach the haptic actuator to a location on a wearable article and to allow detachment of the haptic actuator from the wearable article;
a communication component configured to receive commands; and
a feedback motor and driver configured to provide haptic feedback to the user in response to input from simulated environment software received via the communication component;
the a wearable article, comprising:
a conductive fabric having a matrix of addressable locations configured to indicate a presence or absence of the haptic actuator upon attachment of the haptic actuator to the conductive fabric; and
a controller configured to communicate with the communication component of the haptic actuator to provide feedback to the haptic actuator from the simulated environment software.

21. The system of claim 20, wherein the fastener is reusable and the haptic actuator is movable to a second location on the wearable article after being detached from a first location on the wearable article.

22. The system of claim 20, further comprising a power source associated with the wearable article and capable of powering the conductive fabric, the controller, or the haptic actuator, or a combination thereof.

23. The system of claim 20, further comprising a power source associated with the haptic actuator.

24. The system of claim 20, wherein the wearable article comprises a resistor array configured to be powered by a power source associated with the wearable article.

25. The system of claim 20, wherein the controller and the communication component are operable to communicate using wireless components.

26. The system of claim 20, wherein the controller and the communication component are configured to communicate using wired components.

27. The system of claim 20, wherein the controller is configured to calibrate the location of the haptic actuator on the wearable article before the simulated environment software provides information to the haptic actuator.

28. The system of claim 20, wherein the fabric is sufficiently flexible to substantially conform to contours of a user's body.

* * * * *